(12) United States Patent
Kusunoki et al.

(10) Patent No.: US 8,232,715 B2
(45) Date of Patent: Jul. 31, 2012

(54) PHOSPHOR, FLUORESCENT LAMP USING THE SAME, AND DISPLAY DEVICE AND ILLUMINATING DEVICE USING FLUORESCENT LAMP

(75) Inventors: Tsuneo Kusunoki, Kanagawa (JP); Masaaki Kawamata, Kanagawa (JP); Takahiro Igarashi, Kanagawa (JP); Takashi Tamura, Miyagi (JP); Katsutoshi Ohno, Tokyo (JP)

(73) Assignee: Sony Corporation, Tokyo (JP)

( * ) Notice: Subject to any disclaimer, the term of this patent is extended or adjusted under 35 U.S.C. 154(b) by 608 days.

(21) Appl. No.: 12/167,033

(22) Filed: Jul. 2, 2008

(65) Prior Publication Data

US 2009/0009052 A1 Jan. 8, 2009

(30) Foreign Application Priority Data

Jul. 5, 2007 (JP) ................... 2007-177308

(51) Int. Cl.
 *C09K 11/02* (2006.01)
(52) U.S. Cl. .................. 313/486; 252/301.4 R
(58) Field of Classification Search .......... 313/422, 313/493, 634, 607, 484, 485, 514, 515, 519, 313/633, 631, 491, 483, 475, 473, 56, 169.4; 362/614; 252/301.4 R
See application file for complete search history.

(56) References Cited

U.S. PATENT DOCUMENTS

| | | | | |
|---|---|---|---|---|
| 3,555,337 | A * | 1/1971 | Faria et al. .................. | 313/486 |
| 3,569,762 | A | 3/1971 | Levine | |
| 5,295,146 | A * | 3/1994 | Gavrilovic et al. ............ | 372/41 |
| 6,402,987 | B1 | 6/2002 | Srivastava et al. | |
| 6,996,137 | B2 * | 2/2006 | Byren et al. .................. | 372/10 |
| 7,239,071 | B2 * | 7/2007 | Igarashi et al. ............... | 313/487 |
| 7,674,834 | B2 * | 3/2010 | Chane-Ching et al. ......... | 516/89 |
| 2004/0130256 | A1 * | 7/2004 | Juestel et al. ................. | 313/487 |
| 2005/0077499 | A1 * | 4/2005 | Cheetham et al. ..... | 252/301.4 R |
| 2005/0258733 | A1 | 11/2005 | Igarashi et al. | |
| 2006/0170319 | A1 | 8/2006 | Oku et al. | |
| 2006/0244712 | A1 * | 11/2006 | Cho et al. .................... | 345/102 |
| 2007/0058105 | A1 | 3/2007 | Igarashi et al. | |

FOREIGN PATENT DOCUMENTS

| | | |
|---|---|---|
| GB | 1137576 | 12/1968 |
| JP | 45-7169 | 3/1970 |
| JP | 48-20109 | 6/1973 |
| JP | 48-43278 | 12/1973 |
| JP | 2001226672 | 8/2001 |
| JP | 2005332625 | 12/2005 |
| JP | 2006196374 | 7/2006 |
| JP | 2006322991 | 11/2006 |
| WO | WO 2009157879 A1 * | 12/2009 |

OTHER PUBLICATIONS

Park et al., Materials Science and Engineering, B 146 (2008) pp. 95-98.*
[Strong Quenching of Tb3+ Emission by Y-Tb Interaction in YP04-YV04], J. Chem. Phys., 53(2). 681~685 (1970).
Japanese Office Action issued on May 12, 2009, for corresponding Japanese Patent Application 2007-177308.

* cited by examiner

*Primary Examiner* — Peter Macchiarolo
(74) *Attorney, Agent, or Firm* — K&L Gates LLP

(57) ABSTRACT

A phosphor includes Eu-activated YVO$_4$:Eu doped Pith 10 ppm to 3,000 ppm of Tb and/or 50 ppm to 4,500 ppm of Sm. The luminance of light emitted by ultraviolet excitation is higher than that of undoped YVO$_4$:Eu.

21 Claims, 19 Drawing Sheets

FIG. 2

| | AMOUNT OF RAW MATERIAL MIXED (UNIT: g) | | | |
|---|---|---|---|---|
| SAMPLE NAME | $Y_2O_3$ | $V_2O_5$ | $Eu_2O_3$ | $Tb_4O_7$ |
| NO ADDITION | 53.6508 | 52.2908 | 4.3988 | – |
| Tb 10 ppm | 53.6508 | 52.2908 | 4.3988 | 0.0009 |
| Tb 50 ppm | 53.6508 | 52.2908 | 4.3988 | 0.0047 |
| Tb 100 ppm | 53.6508 | 52.2908 | 4.3988 | 0.0093 |
| Tb 500 ppm | 53.6508 | 52.2908 | 4.3988 | 0.0467 |
| Tb 1000 ppm | 53.6508 | 52.2908 | 4.3988 | 0.0935 |
| Tb 3000 ppm | 53.6508 | 52.2908 | 4.3988 | 0.2805 |
| Tb 5000 ppm | 53.6508 | 52.2908 | 4.3988 | 0.4675 |

FIG. 4

| AMOUNT OF Tb ADDED (ppm) | EXCITING LIGHT (ULTRAVIOLET) IRRADIATION INTENSITY (mW/cm$^2$) | | |
|---|---|---|---|
| | 13 | 65 | 130 |
| 0 | 2751 | 11620 | 17435 |
| 10 | 2711 | 11560 | 18335 |
| 50 | 2710 | 11510 | 18675 |
| 100 | 2733 | 11865 | 19435 |
| 500 | 2563 | 10995 | 18695 |
| 1000 | 2636 | 10725 | 18175 |
| 3000 | 2600 | 11600 | 17500 |
| 5000 | 1932 | 8817 | 13923 |

FIG. 7

| AMOUNT OF Tb ADDED (ppm) | $\gamma$ VALUE | RELATIVE VALUE |
| --- | --- | --- |
| 0 | 0.8184 | 1.000 |
| 10 | 0.8426 | 1.030 |
| 50 | 0.8489 | 1.037 |
| 100 | 0.8626 | 1.054 |
| 500 | 0.8703 | 1.063 |
| 1000 | 0.8444 | 1.032 |
| 3000 | 0.8459 | 1.034 |
| 5000 | 0.8728 | 1.066 |

FIG. 8

| SAMPLE NAME | AMOUNT OF RAW MATERIAL MIXED (UNIT: g) | | | |
|---|---|---|---|---|
| | $Y_2O_3$ | $V_2O_5$ | $Eu_2O_3$ | $Sm_2O_3$ |
| NO ADDITION | 53.6508 | 52.2908 | 4.3988 | – |
| Sm 50 ppm | 53.6508 | 52.2908 | 4.3988 | 0.0044 |
| Sm 100 ppm | 53.6508 | 52.2908 | 4.3988 | 0.0087 |
| Sm 500 ppm | 53.6508 | 52.2908 | 4.3988 | 0.0436 |
| Sm 1000 ppm | 53.6508 | 52.2908 | 4.3988 | 0.0872 |
| Sm 2500 ppm | 53.6508 | 52.2908 | 4.3988 | 0.2179 |
| Sm 5000 ppm | 53.6508 | 52.2908 | 4.3988 | 0.4359 |
| Sm 10000 ppm | 53.6508 | 52.2908 | 4.3988 | 0.8717 |
| Sm 25000 ppm | 53.6508 | 52.2908 | 4.3988 | 2.1794 |

FIG. 10

| AMOUNT OF Sm ADDED (ppm) | EXCITING LIGHT (ULTRAVIOLET) IRRADIATION INTENSITY (mW/cm$^2$) | | |
|---|---|---|---|
| | 13 | 65 | 130 |
| 0 | 2751 | 11620 | 17435 |
| 50 | 2655 | 11351 | 17604 |
| 100 | 2706 | 11279 | 17615 |
| 500 | 2765 | 11702 | 17634 |
| 1000 | 2767 | 11692 | 17834 |
| 2500 | 2549 | 10773 | 17959 |
| 5000 | 2734 | 11584 | 17421 |
| 10000 | 2502 | 10639 | 16293 |
| 25000 | 1994 | 8548 | 13398 |

FIG. 13

| AMOUNT OF Sm ADDED (ppm) | γ VALUE | RELATIVE VALUE |
| --- | --- | --- |
| 0 | 0.8184 | 1.000 |
| 50 | 0.8359 | 1.021 |
| 100 | 0.8205 | 1.003 |
| 500 | 0.8208 | 1.003 |
| 1000 | 0.8244 | 1.007 |
| 2500 | 0.8244 | 1.007 |
| 5000 | 0.8206 | 1.003 |
| 10000 | 0.8288 | 1.013 |
| 25000 | 0.8408 | 1.027 |

(COLD CATHODE FLUORESCENT LAMP)

(HOT CATHODE FLUORESCENT LAMP)

EXTERNAL ELECTRODE FLUORESCENT LAMP (EEFL)

ELECTROLESS FLUORESCENT LAMP (INNER COIL TYPE)

PHOSPHOR, FLUORESCENT LAMP USING THE SAME, AND DISPLAY DEVICE AND ILLUMINATING DEVICE USING FLUORESCENT LAMP

CROSS REFERENCES TO RELATED APPLICATIONS

The present application claims priority to Japanese Patent Application JP 2007-177308 filed in the Japanese Patent Office on Jul. 5, 2007, the entire contents of which are incorporated herein by reference.

BACKGROUND

The present application relates to europium-activated yttrium vanadate ($YVO_4$:Eu) doped with Tb and/or Sm, a fluorescent lamp using the $YVO_4$:Eu, and a display, device and an illuminating device using a fluorescent lamp.

Fluorescent lamps are used as backlights of liquid crystal displays for televisions and PC and coated with various phosphors. Phosphors are also used for various displays other than liquid crystal displays.

In order to win competition with plasma display panels (PDP) and other flat panel displays (FPD), further discrimination is required for liquid crystal displays (LCD). A large factor of discrimination is image quality, and there is keen competition among various types of FPD with respect to luminance, color gamut contrast, motion picture properties, and the like. Among these, the color gamut and luminance are generally contrary to each other. Namely, when the color gamut is extended, the emission wavelengths of a phosphor contributing to emission of a blue light component and a phosphor contributing to emission of a red light component may be shifted to a lower wavelength and a longer wavelength respectively, thereby decreasing luminance in a direction away from the human visibility. In order to extend the color gamut and maintain or improve the luminance, it is desired to use a high-efficiency phosphor or increase the luminous efficiency of the phosphor used.

Display colors of LCD are formed by separating white light, which is emitted from a backlight mainly composed of a fluorescent lamp (a cold cathode fluorescent lamp (CCFL), a hot cathode fluorescent lamp (HCFL), an external electrode fluorescent lamp (EEFL), or a flat fluorescent lamp (FFL)), using blue, green, and red color filters.

A fluorescent lamp is generally coated with phosphors which emit three color lights (in some types, three or more color lights) such as blue light, green light, and red light. The color gamut is, strictly speaking, related to the transmission properties of a liquid crystal portion constituting LCD, but it is basically determined by the transmission properties of a color filter constituting LCD and the emission properties of light emitted from a backlight.

There are active attempts to extend the color gamut of LCD by improving or optimizing a phosphor used in a fluorescent lamp.

Japanese Unexamined Patent Application Publication No. 2005-332625 (paragraphs [0006] to [0010]) entitled "Fluorescent Lamp and Display Device" discloses a fluorescent lamp having a configuration capable of securely suppressing the occurrence of a difference between the compositions of phosphor particle mixtures at both ends of a glass tube and a display device including the fluorescent lamp.

Japanese Unexamined Patent Application Publication No. 2006-322991 (paragraphs [0012] to [0013]) entitled "Liquid Crystal Display Device" discloses a liquid crystal display device capable of extending a color reproduction range when a cold cathode fluorescent lamp is used as a light source.

Japanese Unexamined Patent Application Publication No. 2006-196374 (paragraphs [0010] to [0020]) entitled "Backlight Device and Liquid Crystal Display Device" discloses a backlight device capable of realizing a wider color gamut of a liquid crystal display device with little decreasing a luminescent value and a liquid crystal display device including the backlight device.

A typical example of wide-color-gamut fluorescent lamps uses $BaMgAl_{10}O_{17}$:Eu or $(Sr, Ca, Ba, Mg)_5(PO_4)_3Cl$:EU as a blue phosphor, $BaMgAl_{10}O_{17}$:Eu, Mn as a green phosphor, and $YVO_4$:Eu, $Y(V, P)O_4$:Eu, or $3.5MgO.0.5MgF_2.GeO_2$:Mn as a red phosphor.

Among these colors, red has high attractiveness and easily attracts attention, and thus a large improvement effect is expected. A red phosphor $YVO_4$:Eu for wide-color gamut fluorescent lamps has an emission peak at 620 nm which is longer than the emission wavelength of 611 nm of ordinary $Y_2O_3$:Eu, and thus red chromaticity may be improved.

With respect to a red light-emitting phosphor. Japanese Unexamined Patent Application Publication No. 2001-226672 (claims 1 to 3 and 8 paragraphs [0048] and [0056]) entitled "Phosphor with Improved Lumen Maintenance Factor" describes the following;

(1) A composition containing $YMO_4$:Eu, L (wherein M is at least one of vanadium and phosphorus, and L is at least one of trivalent rare earth ion species excluding Eu and divalent metal ion species).

(2) The composition described in (1) wherein Eu is an ion with a valence of +3.

(3) The composition described in (1), containing $(Y_{1-x-z}D_xT_z)MO_4$:Eu (wherein $0 \leq x \leq 0.05$, $0 \leq z \leq 0.02$, D is at least one of divalent metal ion species, and T is at least one of trivalent rare earth ion species excluding Eu).

(4) The composition described in (3), containing $(Y_{1-q}Tb_q)VO_4$:Eu (wherein $0 < q \leq 0.02$).

In order to prove the effect of improving lumen maintenance by adding trivalent rare earth ions, the characteristics of $(Y, Tb)VO_4$:$Eu^{3+}$ phosphor $(Y_{0.9497}Eu_{0.05}Tb_{0.0003}VO_4)$ were examined by TTL. A $Y_{0.949}Tb_{0.001}Eu_{0.05}VO_4$ phosphor was prepared by a liquid phase flux method.

The emission properties and the like of phosphor $YVO_4$:Eu are described in "Phosphor Handbook" edited by Phosphor Research Society first edition, OHMSHA, Ltd, 1987 (pp. 233-235).

With respect to phosphor $YVO_4$:Eu, "Strong Quenching of $Tb^{3+}$ Emission by Y—Tb Interaction in $YPO_4$-$YVO_4$", J. Chem. Phys., 53(2), 681-685 (1970) (INTRODUCTION) describes that $YVO_4$:Eu emits light, while $YVO_4$:Tb does not emit light.

SUMMARY

Widening of a color gamut depends on the wavelength of each of the color phosphors used for a fluorescent lamp and can be achieved by selecting a proper phosphor but has the problem of decreasing luminance.

A red phosphor $YVO_4$:Eu used for wide color gamut fluorescent lamps has an emission peak at 620 nm which is longer than the emission wavelength of 611 nm of $Y_2O_3$:Eu, and thus red chromaticity may be increased. However, a fluorescent lamp using $YVO_4$:Eu as a red light-emitting phosphor has lower luminance than that of a fluorescent lamp using $Y_2O_3$:Eu, thereby causing strong demand for improvement in luminance. Therefore, widening of a color gamut can be achieved by selecting such a phosphor but has the problem of decreasing luminance.

FIG. 1 is a graph showing the dependence of luminance of $YVO_4$:Eu and $Y_2O_3$:Eu on intensity of exciting ultraviolet light.

FIG. 1 shows the measurement results of the ultraviolet intensity dependence of luminance of light emitted by irradiating $YVO_4$:Eu and $Y_2O_3$:Eu with ultraviolet light at 254 nm. In a cold-cathode tube which is typical of fluorescent lamps for LCD backlights, a phosphor is excited with bright lines of Hg, and particularly a bright line at 254 nm among the many Hg bright lines is converted at a ratio of about 60% of input energy and mainly contributes to excitation. According to the results shown in FIG. 1, the luminance of $YVO_4$:Eu increases at a lower rate than that of $Y_2O_3$:Eu as the excitation intensity increases. The phenomenon that luminance does not increase in proportion to the excitation intensity is referred to as "luminance saturation", and luminance saturation occurs in $YVO_4$:Eu as compared with $Y_2O_3$:Eu. As an index for luminance saturation, γ (hereinafter referred to as a "luminance saturation constant") used in $I=\alpha I_{uv}^{\gamma}$ (I: luminance of emitted light, $I_{uv}$: excitation intensity, α: constant) may be used. When γ is 1, saturation does not occur.

FIG. 1 indicates that the calculated γ values of $Y_2O_3$:Eu and $YVO_4$:Eu are 0.96 and 0.82, respectively, and thus $YVO_4$:Eu apparently causes luminance saturation. In consideration of this phenomenon, the present application provides a method of improving the luminance saturation of $YVO_4$:Eu, resulting in improvement in luminance.

Japanese Unexamined Patent Application Publication No. 2001-226672 (claims 1 to 3 and 8, paragraphs [0048] and [0056]) shows initial lumen (luminous flux) output in Table 1. This document shows that the initial lumen output of (Y, Tb)$VO_4$:Eu$^{3+}$ is decreased by 0.2% from that of $YVO_4$:Eu$^{3+}$. However, the composition of Tb in (Y, Tb)$VO_4$:Eu$^{3+}$ is not described in this document.

The Tb contents in $Y_{0.9497}Eu_{0.05}Tb_{0.0003}VO_4$ and $Y_{0.949}Tb_{0.001}Eu_{0.05}VO_4$ described in Japanese Unexamined Patent Application Publication No. 2001-226672 (claims 1 to 3 and 8, paragraphs [0048] and [00561]) are 300 ppm and 1000 ppm. respectively. However, this document does not describe changes in luminance of emitted light with changes in the composition of Tb and/or Sm in a phosphor and luminance saturation properties representing a relation between irradiation intensity of exciting light and luminance of emitted light. Also, this document does not describe an appropriate amount for improving the luminance and luminance saturation properties when Tb and/or Sm is added to $YVO_4$:Eu.

It is desired to provide a phosphor with high luminance and improved luminance saturation, a fluorescent lamp using the phosphor, and a display device and an illuminating device using a fluorescent lamp.

In accordance with an embodiment, a phosphor contains Eu-activated $YVO_4$:Eu doped with 10 ppm to 3,000 ppm of Tb and/or 50 ppm to 4,500 ppm Sm so that the luminance of light emitted by excitation with ultraviolet light is higher than that of the above-mentioned general $YVO_4$:Eu.

In accordance with another embodiment a fluorescent lamp is coated with the phosphor.

In accordance with a further embodiment, a display device includes the fluorescent lamp serving as a light source for irradiating a display portion.

In accordance with a further embodiment, an illuminating device includes the fluorescent lamp serving as a light source.

The phosphor contains Eu-activated $YVO_4$:Eu doped with 10 ppm to 3000 ppm of Tb and/or 50 ppm to 4500 ppm Sm so that the intensity (luminance) of light emitted by excitation with ultraviolet light is higher than that of the above-mentioned general $YVO_4$:Eu and the luminance saturation phenomenon is improved. It is possible to provide a fluorescent lamp with a wider color gamut and improved luminance using the phosphor and provide a display device and an illuminating device with improved color reproducibility and luminance using the fluorescent lamp.

Additional features and advantages are described herein, and will be apparent from the following Detailed Description and the figures.

BRIEF DESCRIPTION OF TIE FIGURES

FIG. 2 is a table illustrating synthesis of the $YVO_4$:Eu doped with Tb shown in FIG. 1;

FIG. 4 is a table illustrating the dependence of luminance of the $YVO_4$:Eu doped with Tb on the amount of Tb added with an exciting light irradiation intensity;

Figure 6A:
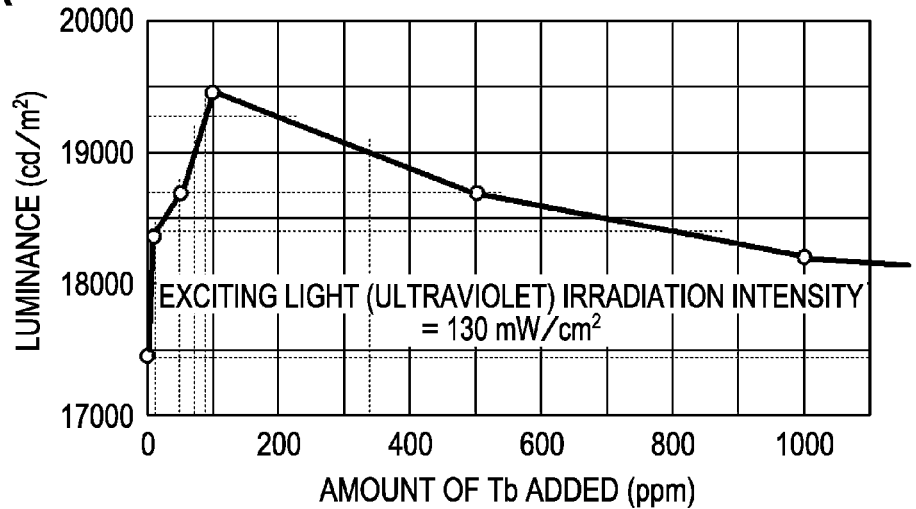
Figure 6B:
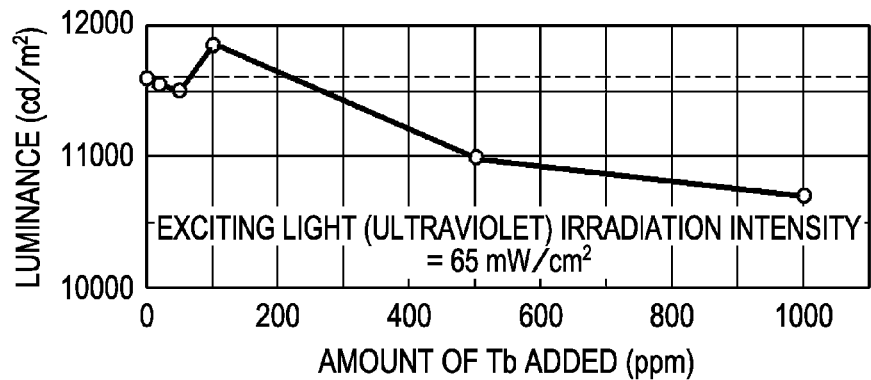
Figure 6C:
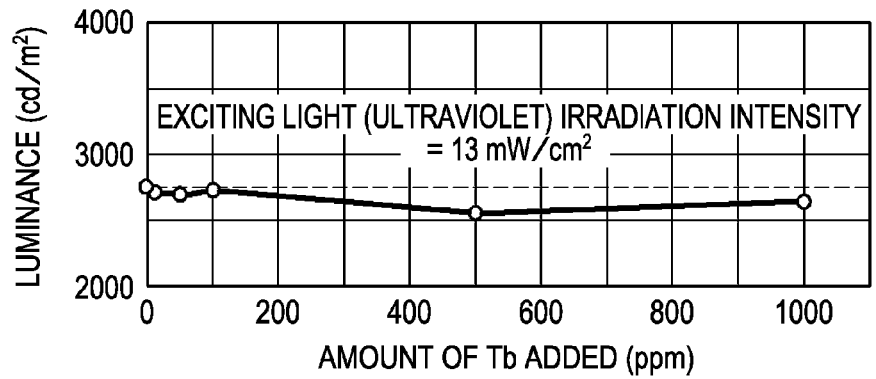

FIGS. 6A, 6B, and 6C are graphs illustrating the dependence of luminance of the $YVO_4$:Eu doped with Tb on the amount of Tb added with an exciting light irradiation intensity;

FIG. 7 is a table illustrating the dependence (γ value) of luminance of the $YVO_4$:Eu doped with Tb on exciting light irradiation intensity.

Figure 9:
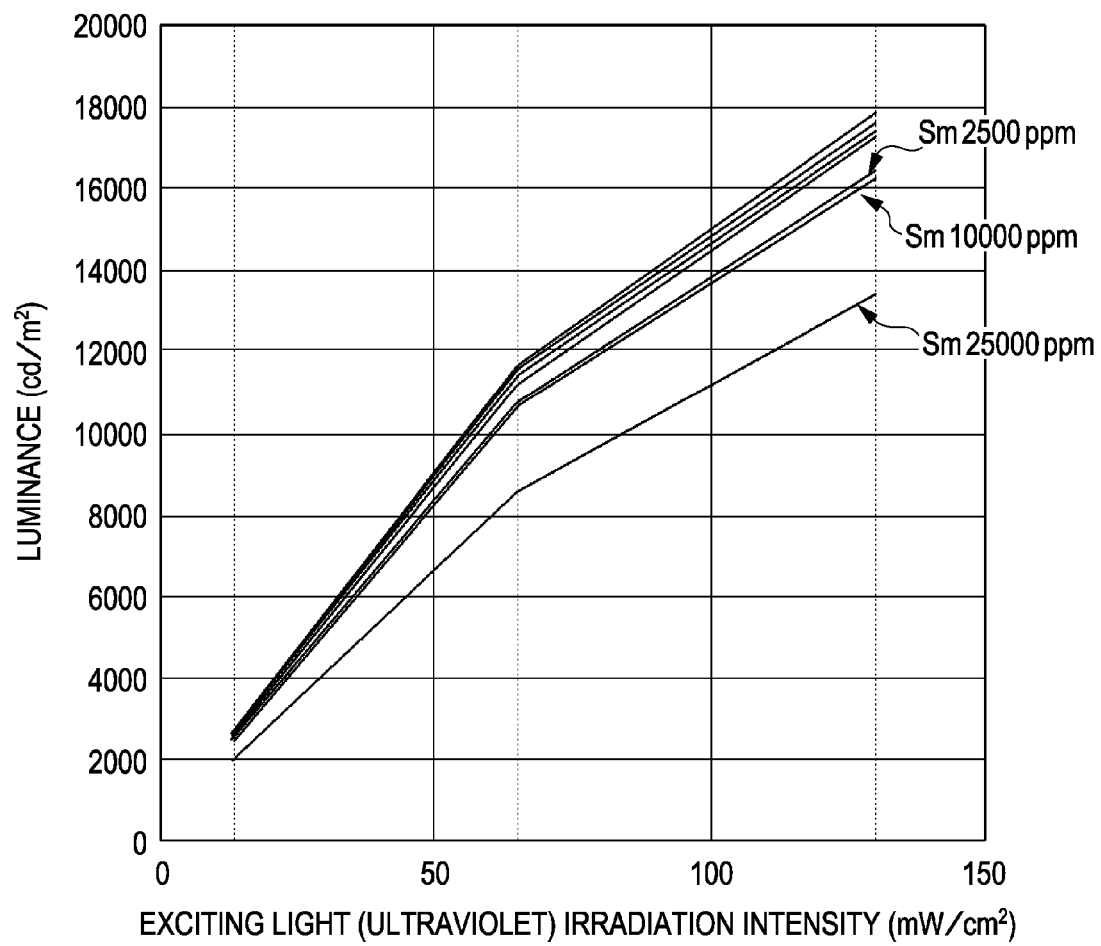
Figure 11:
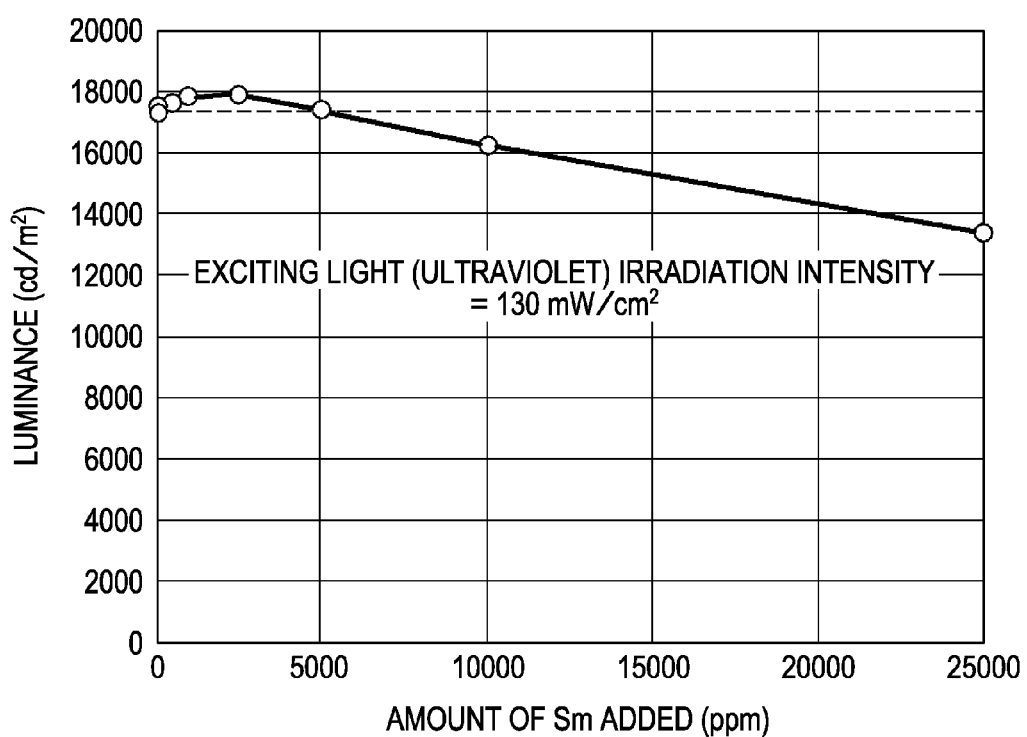
Figure 12A:
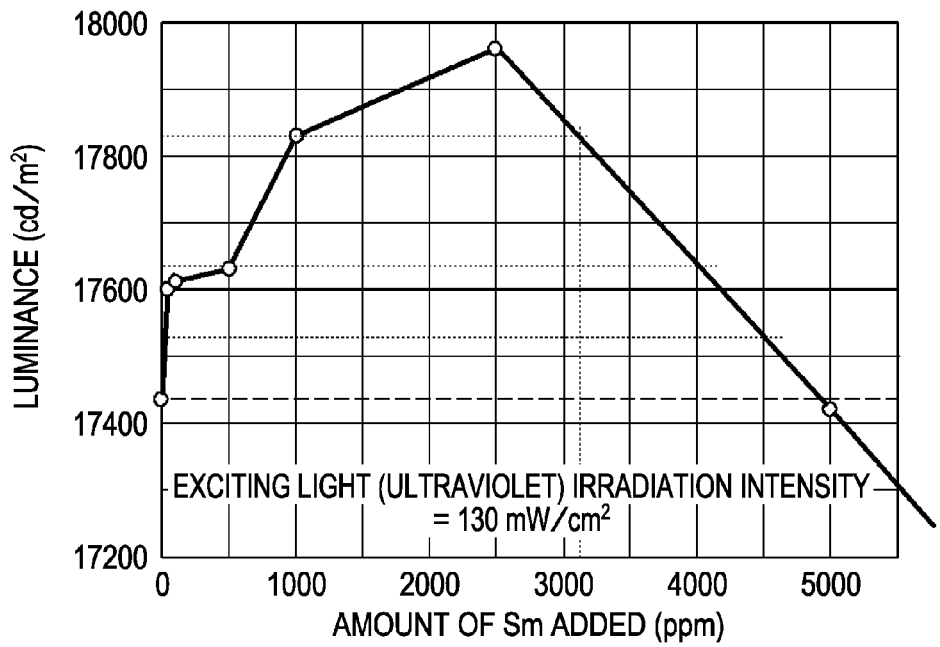
Figure 12B:
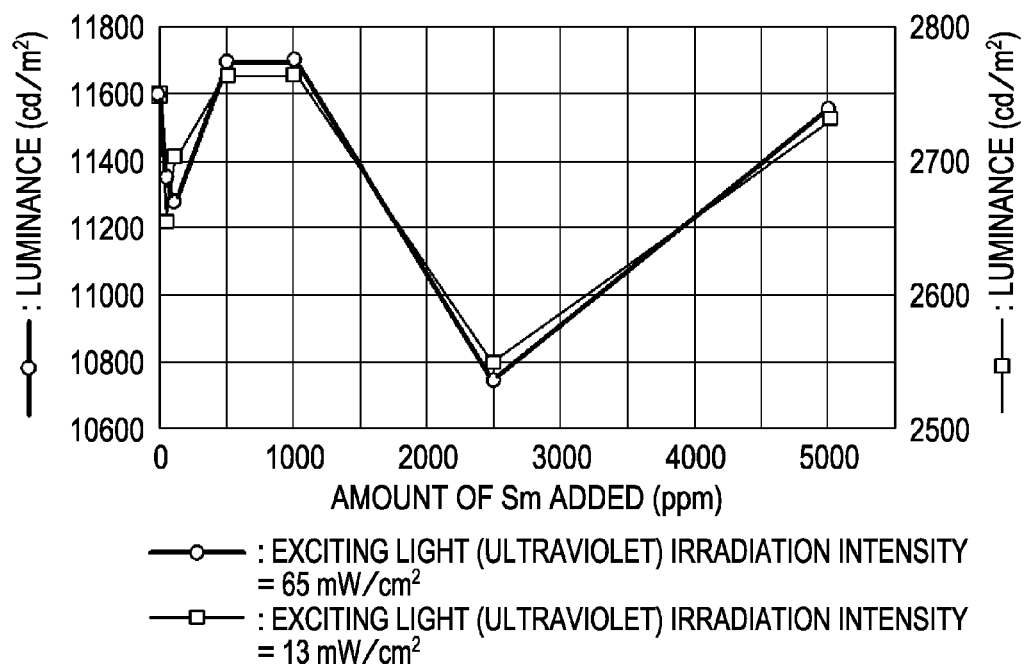
Figure 14A:
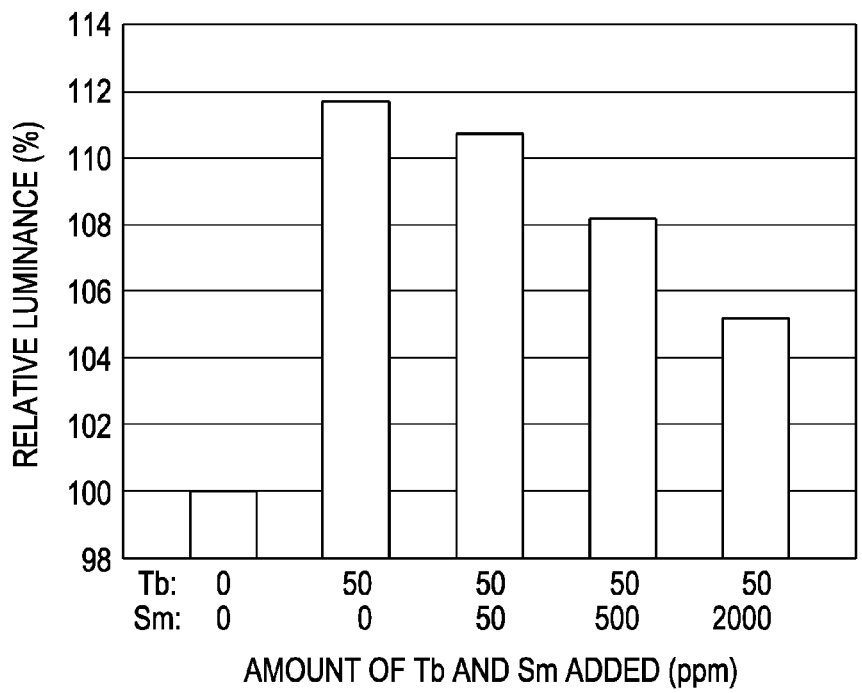
Figure 14B:
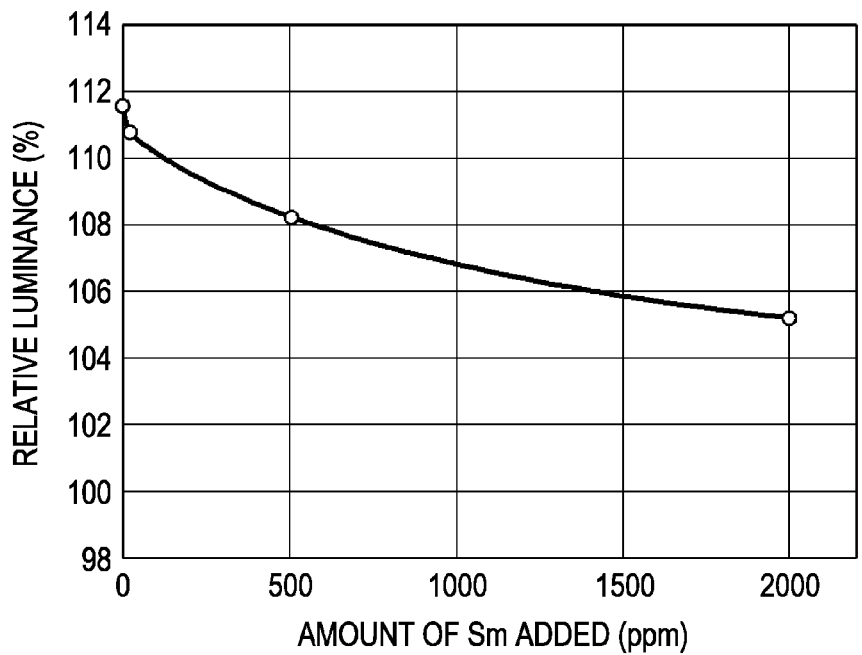
Figure 15A:
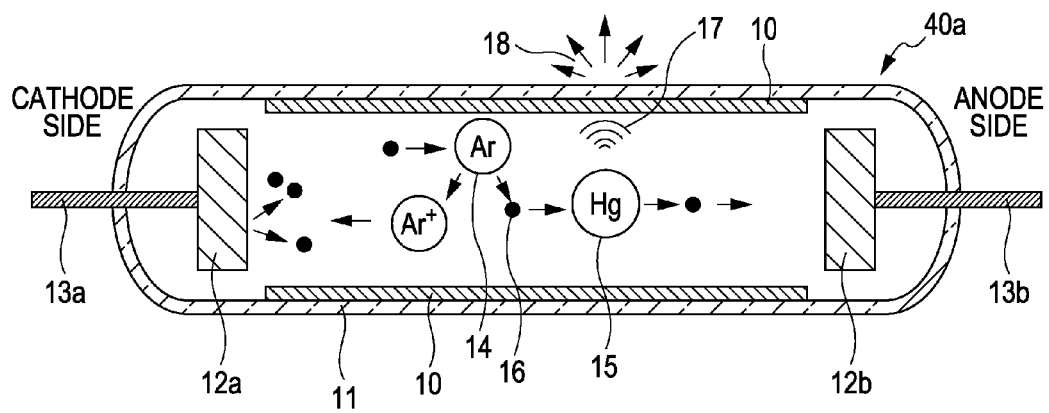
Figure 15B:
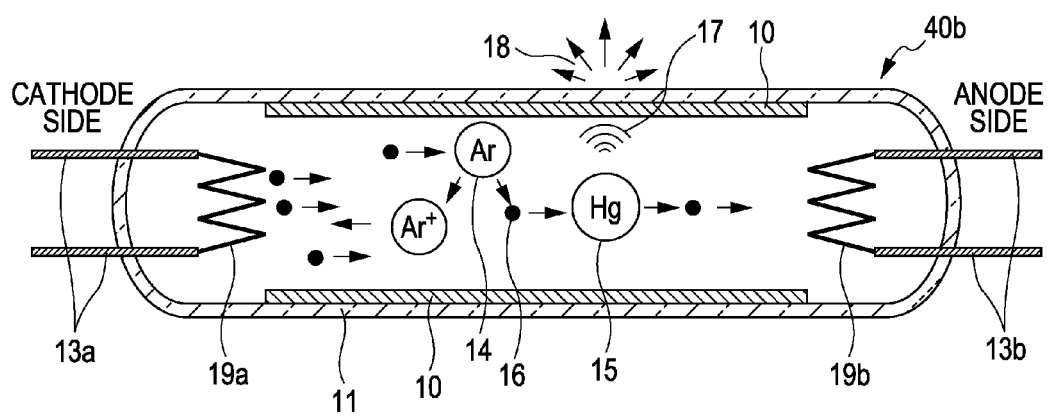
Figure 16A:
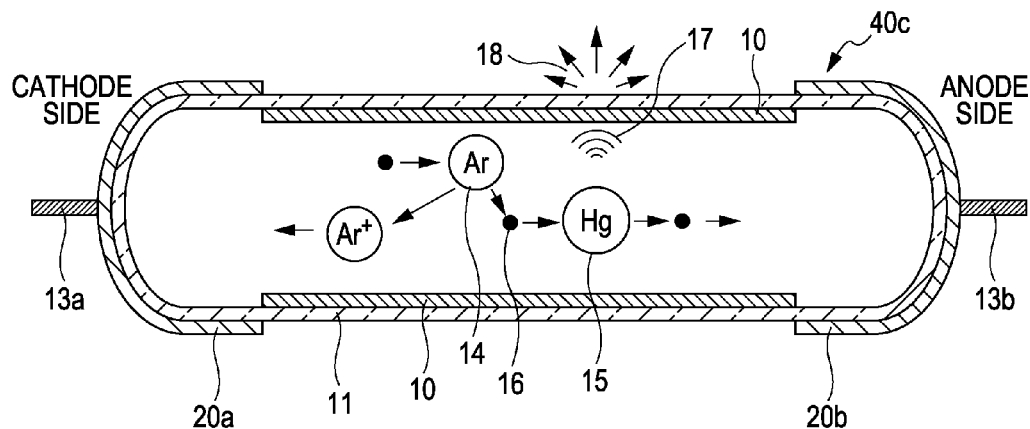
Figure 16B:
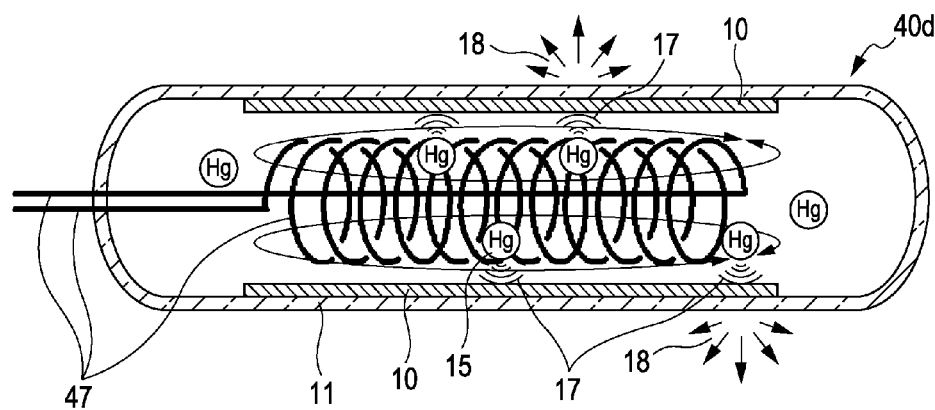
Figure 17A:
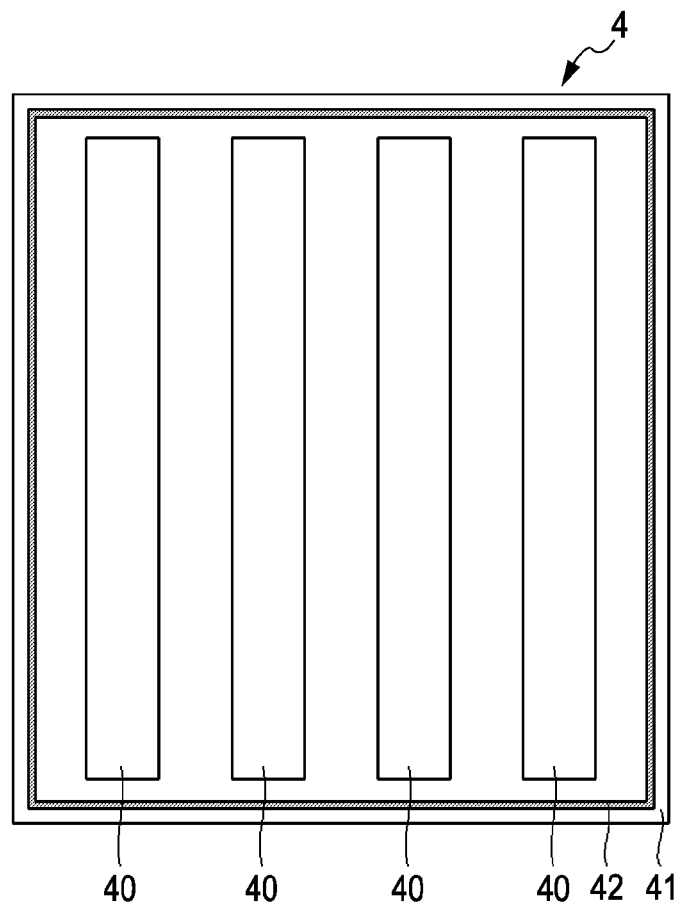
Figure 17B:
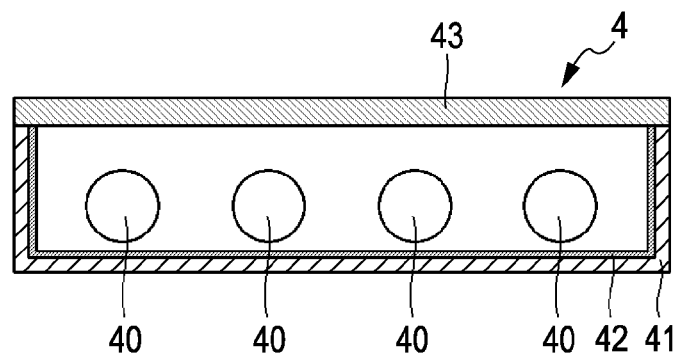
Figure 18:
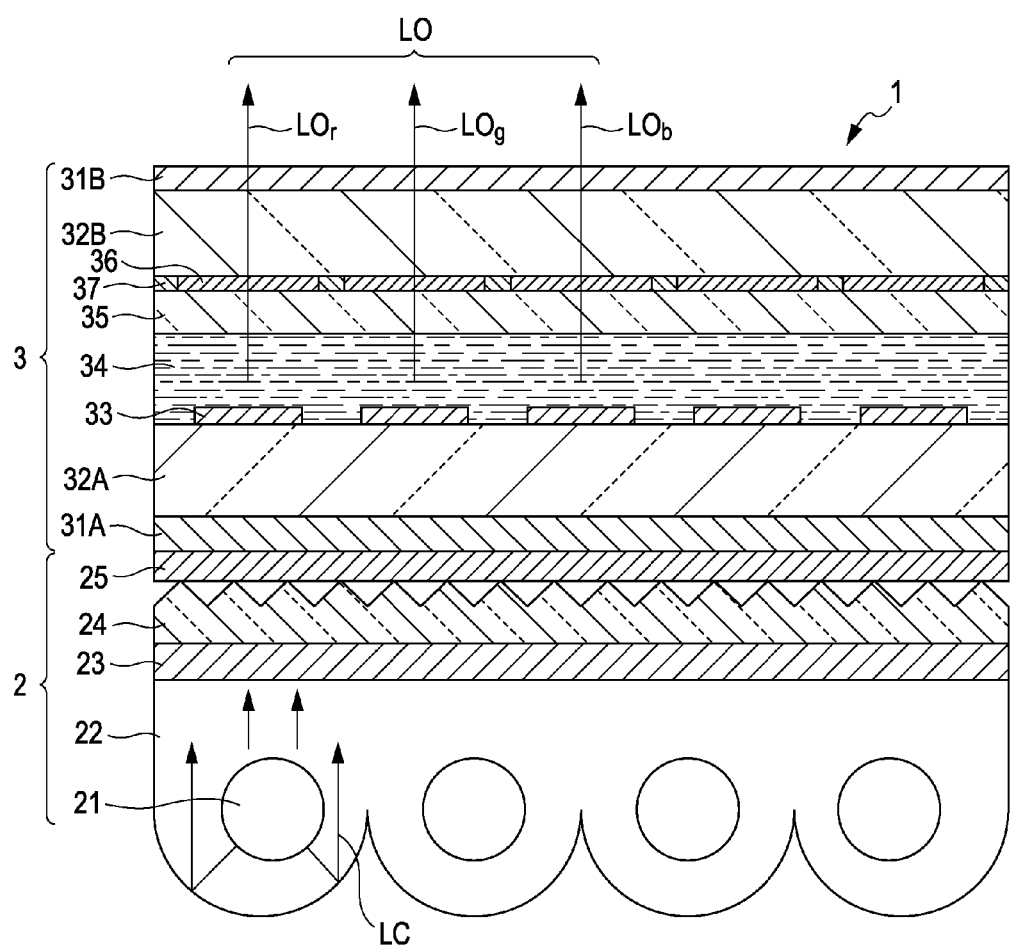
Figure 19A:
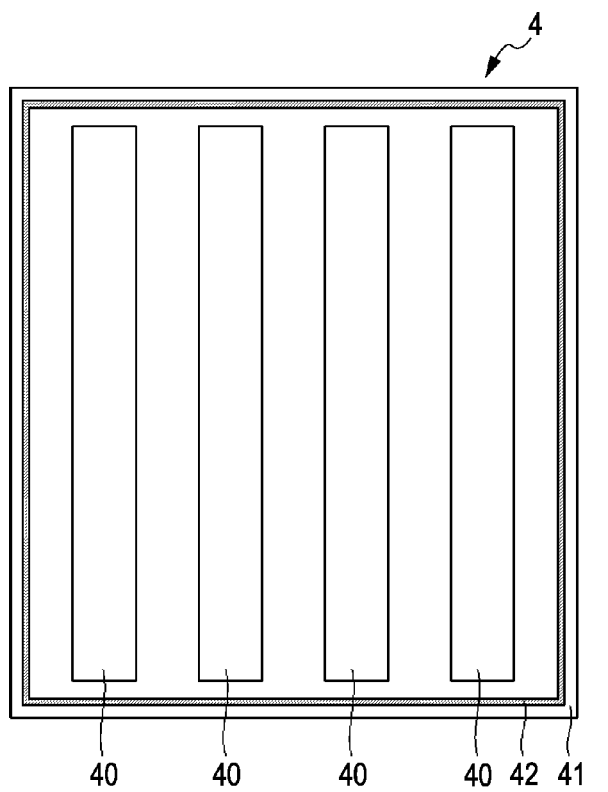
Figure 19B:
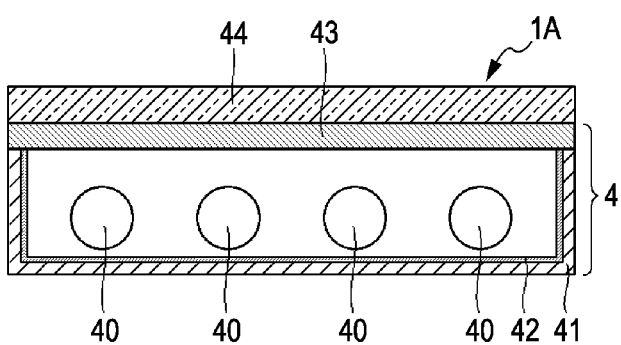
Figure 19C:
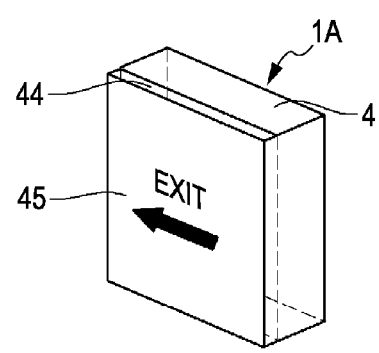

FIG. 8 is a table illustrating synthesis of $YVO_4$:Eu doped with Sm;

FIG. 9 is a graph illustrating the dependence of luminance of the $YVO_4$:Eu doped with Sm on exciting light irradiation intensity;

FIG. 10 is a table illustrating the dependence of luminance of the $YVO_4$:Eu doped with Sm on the amount of Sm added with an exciting light irradiation intensity;

FIG. 11 is a graph illustrating the dependence of luminance of the $YVO_4$:Eu doped with Sm on the amount of Sm added with an exciting light irradiation intensity of 130 mW/cm$^2$;

FIGS. 12A and 12B are graphs illustrating the dependence of luminance of the $YVO_4$:Eu doped with Sm on the amount of Sm added with an exciting light irradiation intensity:

FIG. 13 is a table illustrating the dependence (γ value) of luminance of the $YVO_4$:Eu doped with Sm on exciting light irradiation intensity;

FIGS. 14A and 14B are graphs illustrating the dependence of luminance of the $YVO_4$:Eu doped with Tb and Sm on exciting light irradiation intensity:

FIGS. 15A and 15B are sectional views schematically shooting the configurations of a cold-cathode fluorescent lamp (CCFL) and a hot-cathode fluorescent lamp (HCFL), respectively, for illustrating the configuration of a fluorescent lamp according to an embodiment;

FIGS. 16A and 16B are sectional views schematically showing the configurations of a external electrode fluorescent lamp (EEFL) and an electroless fluorescent lamp (inner coil type), respectively, for illustrating the configuration of a fluorescent lamp according to an embodiment;

FIGS. 17A and 17B are a plan view and a sectional view taken along a plane perpendicular to the longitudinal direction of a fluorescent lamp, respectively, for illustrating an example of a configuration of an illuminating device according to an embodiment;

FIG. 18 is a sectional view showing an example of a configuration of a liquid crystal display according to an embodiment; and FIGS. 19A, 19B, and 19C are a plan view, a sectional view taken along a plane perpendicular to the longitudinal direction of a fluorescent lamp, and a perspective view, respectively for illustrating an example of a configuration of a display device according to an embodiment.

DETAILED DESCRIPTION

A phosphor according to an embodiment is configured so that a luminance saturation constant indicating a relation between the luminance of light emitted by excitation with ultraviolet light and ultraviolet light excitation intensity is larger than that of the above-mentioned ordinary $YVO_4$:Eu. This configuration is capable of increasing the luminance and improving the luminance saturation phenomenon.

In addition, 10 ppm to 800 ppm of Tb may be added. This configuration is capable of increasing the luminance and improving the luminance saturation phenomenon of a phosphor doped with Tb.

The luminance of light emitted by excitation with ultraviolet light at 130 mW/cm$^2$ may be 1.06 or more times as large as that of the above-mentioned ordinary $YVO_4$:Eu. This configuration is capable or improving the luminance saturation phenomenon.

The luminance saturation constant indicating a relation between the luminance of light emitted by ultraviolet excitation and ultraviolet light excitation intensity is 1.03 or more times as large as that of the above-mentioned ordinary, $YVO_4$:Eu. This configuration is capable of improving the luminance saturation phenomenon.

In addition, 70 ppm to 340 ppm of Tb may be added. This configuration is capable of further increasing the luminance and improving the luminance saturation phenomenon of the phosphor doped with Tb as compared with a phosphor not doped with Tb.

The luminance of light emitted by excitation with ultraviolet light at 130 mW/cm$^2$ may be 1.09 or more times as large as that of the above-mentioned ordinary $YVO_4$:Eu. This configuration is capable of improving the luminance saturation phenomenon.

In addition, 90 ppm to 200 ppm of Tb may be added. This configuration is capable of increasing the luminance and improving the luminance saturation phenomenon of the phosphor doped with Tb as compared with a phosphor not doped with Tb.

The luminance of light emitted by excitation with ultraviolet light at 130 mW/cm$^2$ may be 1.10 or more times as large as that of the above-mentioned ordinary $YVO_4$:Eu. This configuration is capable of improving die luminance saturation phenomenon.

In addition, 50 ppm to 500 ppm of Tb may be added. This configuration is capable of increasing the luminance and improving the luminance saturation phenomenon of the phosphor doped with Tb as compared with a phosphor not doped with Tb.

The luminance of light emitted by excitation with ultraviolet light at 130 mW/cm$^2$ may be 1.07 or more times as large as that of the above-mentioned ordinary $YVO_4$:Eu. This configuration is capable of improving the luminance saturation phenomenon.

The luminance saturation constant indicating a relation between the luminance of light emitted by ultraviolet excitation and ultraviolet light excitation intensity is 1.04 or more times as large as that of the above-mentioned ordinary $YVO_4$:Eu. This configuration is capable of improving the luminance saturation phenomenon.

In addition, 500 ppm to 4000 ppm of Sm may be added. This configuration is capable of increasing the luminance and improving the luminance saturation phenomenon of a phosphor doped with Sm as compared with a phosphor not doped with Sm.

The luminance of light emitted by excitation with ultraviolet light at 130 mW/cm$^2$ may be 1.01 or more times as large as that of the above-mentioned ordinary, $YVO_4$:Eu. This configuration is capable of improving the luminance saturation phenomenon.

In addition, 1000 ppm to 3100 ppm of Sm may be added. This configuration is capable of increasing the luminance and improving the luminance saturation phenomenon of the phosphor doped with Sm as compared with a phosphor not doped with Sm.

The luminance of light emitted by excitation with ultraviolet light at 130 mW/cm$^2$ may be 1.02 or more times as large as that of the above-mentioned ordinary $YVO_4$:Eu. This configuration is capable of improving the luminance saturation phenomenon.

A fluorescent lamp according to an embodiment may, be configured as any one of a cold-cathode fluorescent lamp, a hot-cathode fluorescent lamp, an external electrode fluorescent, and an electroless fluorescent lamp. This configuration is capable of realizing a fluorescent lamp with high luminance.

The phosphor is configured to emit red light ba ultraviolet excitation. This configuration is capable of widening the color gamut and increasing luminance.

A display device according to an embodiment includes the fluorescent lamp disposed in a direction perpendicular to a display screen of a display portion or a direction along a side direction of a display screen of a display portion. This configuration is capable of widening the color gamut and improving luminance and color reproducibility.

Embodiments will be described in detail with reference to the drawings.

Embodiment

A phosphor was synthesized according to the following procedures: Predetermined amounts of $Y_2O_3$, $V_2O_5$, $Eu_2O_3$, $Tb_4O_7$, and $Sm_2O_3$ used as raw materials were weighed and mixed in ethanol by a ball mill system. The resultant mixture was filtered, dried, placed in a quartz crucible, and then fired in air at 1100° C. for 2 hours. After firing, the mixture was washed with an alkali solution and water and then dried.

As a result, a phosphor $YVO_4$:Eu doped with 10 ppm to 5000 ppm of Tb and a phosphor $YVO_4$:Eu doped with 50 ppm to 25000 ppm of Sm were synthesized. As a comparative example, a phosphor $YVO_4$:Eu not doped with Tb or Sm was synthesized.

Figure 1:
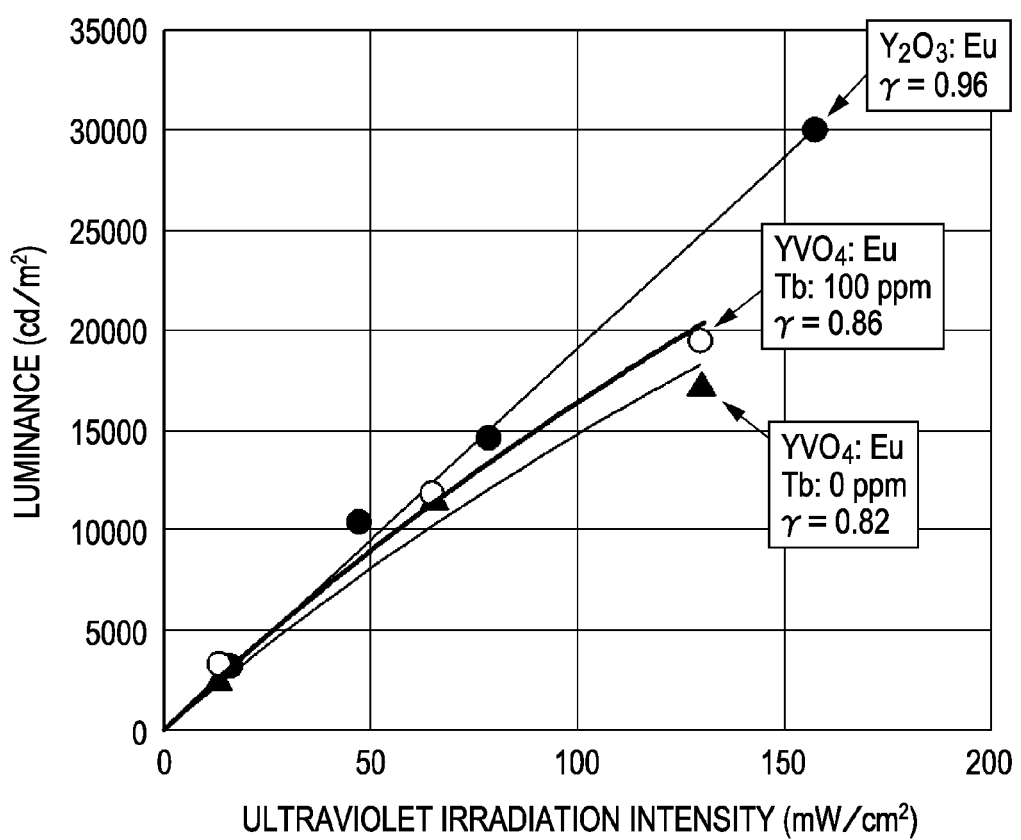
FIG. 1 is a graph illustrating a comparison of results of the dependence of luminance on exciting light irradiation intensity between $YVO_4$:Eu doped with Tb and a general phosphor in an example of the present application.

FIG. 1 is a graph illustrating a comparison of results of the dependence of luminance on exciting light irradiation intensity between $YVO_4$:Eu doped with Tb and a general phosphor in an example;

FIG. 1 shows the measurement results of the ultraviolet intensity dependence of luminance of light emitted by, irradiating $Y_2O_3$:Eu, $YVO_4$:Eu, and $YVO_4$:Eu doped with 100 ppm of Tb with ultraviolet light at 254 nm. The luminance was measured with a luminance colorimeter (PHOTO RESEARCH CORPORATION, PR705).

According to the results shown in FIG. 1, the luminance of $YVO_4$:Eu doped with 100 ppm of Tb increases at a higher rate than that of $YVO_4$:Eu as the excitation intensity increases. Therefore, the luminance saturation is improved, and the luminance is improved by adding 100 ppm of Tb, resulting in improvement of the luminance saturation. Also, the results indicate that the luminance saturation constant γ as an index indicating the luminance saturation is improved from 0.82 to 0.86.

The same improvement was observed in $YVO_4$:Eu doped with Sm and $YVO_4$:Eu doped with Tb at a different concentration.

The phosphor according to the embodiment can be used by applying to the inner surface of a fluorescent lamp described with reference to FIGS. 15A to 16B.

FIGS. 15A and 15B are sectional views schematically showing the configurations of a cold-cathode fluorescent lamp (CCFL) 40a and a hot-cathode fluorescent lamp (HCFL) 40b, respectively, for illustrating the configuration of a fluorescent lamp according to an embodiment.

As shown in FIG. 15A, a phosphor is applied to the inner surface of a glass tube 11 of the cold-cathode fluorescent lamp 40a to form a phosphor layer 10, and Hg 15 is sealed together with rare gas such as Ar 14 in the glass tube 11. In addition, a cathode-side internal electrode 12a and an anode-side internal electrode 12b are provided in the glass tube 11 at both ends thereof without a filament electrode.

In the CCFL 40a, when a high voltage is applied between the cathode-side internal electrode 12a and the anode-side internal electrode 12b from a cathode-side conductor wire 13a and an anode-side conductor wire 13b, electrons emitted from the cathode-side internal electrode 12a due to cold-cathode emission or the electrons already present in the glass tube 11 are accelerated to produce Ar ions and electrons by collision between electrons 16 and Ar 14, i.e., Ar 14 is ionized. The Ar ions are accelerated to the cathode side and collide with the cathode-side internal electrode 12a to emit electrons from the electrode 12a. The emitted secondary electrons are accelerated to the anode side to again ionize Ar 14. As a result, electron avalanche occurs to start discharge, thereby maintaining stable discharge.

The Hg 15 is excited from a ground state to an excited state bad collision with the electrons 16, and ultraviolet light 17 is emitted when the Hg in the excited state returns to the ground state. The ultraviolet light 17 is applied to the phosphor in the phosphor layer 10 to excite the phosphor and produce fluorescent light. When the phosphor layer 10 contains a plurality of phosphors which emit visible light 18 in different wavelength regions as fluorescent light, a color mixture of fluorescent lights in different wavelength regions is emitted to the outside of the glass tube 11.

In the HCFL 40b shown in FIG. 15B, the cathode-side internal electrode 12a and the anode-side internal electrode 12b in the CCFL 40a shove in FIG. 15A are replaced by a cathode-side filament 19a and an anode-side filament 19b, respectively. In the HCFL 40b, a current is passed through the cathode-side filament 19a to generate thermoelectrons. When a high voltage is applied between the cathode-side filament 19a and the anode-side filament 19b, thermoelectrons produced from the filament are accelerated to the anode side. The accelerated thermoelectrons collide with Ar 14 to produce Ar ions and electrons, i.e., ionize the Ar 14. The emitted secondary electrons are accelerated to the anode side to excite Hg 15 by collision between electrons 16 and Hg 15 and produce ultraviolet light 17. Like in the CCFL 40a, the ultraviolet light 17 contributes to emission of visible light 18 to the outside of the glass tube 11.

FIGS. 16A and 16B are sectional views schematically showing the configurations of an external electrode fluorescent lamp (EEFL) 40c and an electroless fluorescent lamp (inner coil type) 40d, respectively for illustrating the configuration of a fluorescent lamp according to an embodiment.

As shown in FIG. 16A, unlike in the CCFL 40a and HCFL 40b, in the EEFL 40c, electrodes are not provided in a glass tube 11, but a cathode-side external electrode 20a and an anode-side external electrode 20b are provided outside the glass tube 11 at both ends thereof. A voltage is applied from the outside of the glass tube 11 to produce discharge in the glass tube 11. The discharge ionizes Ar 14 and emitted secondary electrons are accelerated to the anode side to excite Hg 15 by collision between electrons 16 and Hg 15 and produce ultraviolet light 17. Like in the CCFL 40a and the HCFL 40b, the ultraviolet light 17 contributes to the emission of visible light 18 to the outside of the glass tube 11.

As shown in FIG. 16B, unlike in the CCFL 40a, HCFL 40b, and EEFL 40c, in the electroless fluorescent lamp 40d, Hg 15 sealed in a glass tube 11 is excited to produce ultraviolet light 17 by a high-frequency electromagnetic field produced from a coil 47 disposed inside or outside the glass tube 11 without using an electrode for discharge. Like in the CCFL 40a, the HCFL 40b, and the EEFL 40c, the ultraviolet light 17 contributes to emission of visible light 18 to the outside of the glass tube 11. Although FIG. 16B shows an inner coil type, a configuration (outer coil type) in which the coil 47 is disposed outside the glass tube 11 may be used.

Each of the fluorescent lamps shown in FIGS. 15A, 15B, 16A, and 16B can be used for an illuminating device which will be described below.

Next, an illuminating device using a phosphor according to an embodiment is described.

FIGS. 17A and 17B are a plan view and a sectional view taken along a plane perpendicular to the longitudinal direction of a fluorescent lamp, respectively, for illustrating an example of a configuration of an illuminating device according to an embodiment.

As shown in FIGS. 17A and 17B, in an illuminating device 4, fluorescent lamps 40 are disposed in a lamp box 41 in which a diffuse reflecting layer 41 is formed on the inner surface by applying a white coating material containing a white reflective material dispersed in a resin, the top of the lamp box 41 being covered with a diffusion plate 43. As the fluorescent lamps 40, any one of the cold-cathode fluorescent lamp, the hot-cathode fluorescent lamp, the external electrode fluorescent lamp, and the electroless fluorescent lamp shown in FIGS. 15A to 16B is used. In addition, a microlens sheet or a prism sheet may be disposed on the outer surface of the diffusion plate 43 in order to decrease luminance variation by directing upward the light emitted from the inside of the lamp box 41. The illuminating device 40 configured as described above is used as, for example, a direct-lighting type backlight provided below a liquid crystal display.

Next, a display device using a fluorescent lamp according to an embodiment is described.

FIG. 18 is a sectional view taken along a plane perpendicular to the longitudinal direction of a cold-cathode fluorescent lamp, showing an example of a configuration of a liquid crystal display according to an embodiment.

FIG. 18 shows a sectional structure of a liquid crystal display according to an embodiment. A liquid crystal display 1 includes a liquid crystal panel 3 and an illuminating device 2 disposed on the back (opposite to the image observation side) of the liquid crystal panel 3. Namely, the liquid crystal display 1 is a transmissive type in which display light LO including red display light $LO_r$, green display light $LO_g$, and blue display light $LO_b$ is emitted to a display surface of the liquid crystal panel 3 using lamp light (white light) emitted from the illuminating device 2.

In the illuminating device 2, a plurality (in the example shown in FIG. 18, four lamps) of cold-cathode fluorescent lamps (CCFL) 21 are arranged in parallel as light sources. In addition, a reflecting plate 22 is provided around the cold-cathode fluorescent lamps 21 except on the liquid crystal panel side. Further, a diffusion sheet 23 and a prism sheet 24 are provided on the liquid crystal panel side of the cold-cathode fluorescent lamps 21 in that order from the cold-cathode fluorescent lamp side.

Each of the cold-cathode fluorescent lamps 21 serves as a light source which emits white light to the liquid crystal panel 3 and includes a red phosphor for emitting red light, a green phosphor for emitting green light, and a blue phosphor for emitting blue light. For example, $YVO_4$:Eu doped with Tb and/or Sm, $BaMgAl_{10}O_{17}$:Eu, Mn, and $BaMgAl_{10}O_{17}$:Eu can be used as the red phosphor, the green phosphor, and the blue phosphor, respectively.

In the configuration shown in FIG. 18, each of the cold-cathode fluorescent lamps 21 may be replaced by the HCFL shown in FIG. 15B, the EEFL shown in FIG. 16A, or the electroless fluorescent lamp shown in FIG. 16B.

The reflecting plate 22 is adapted to reflect white light (lamp light) LC emitted from the cold-cathode fluorescent lamps 21 toward the liquid crystal panel side. Consequently, the lamp light LC emitted from the cold-cathode fluorescent lamps 21 can be efficiently utilized.

The diffusion sheets 23 and 25 are adapted to decrease brightness variation by diffusing the lamp light LC emitted to the liquid crystal panel 3. The prism sheet 24 is adapted to orient the direction of the lamp light LC.

The liquid crystal panel 3 has a laminated structure including a multilayer film provided between a pair of glass substrates 32A and 32B (the illuminating device-side glass substrate 32A and the observation-side glass substrate 32B). Specifically, the multilayer film includes a transparent pixel electrode 33 disposed on each pixel, a liquid crystal layer 34, a transparent electrode 35 common to the pixels, a color filter 36 disposed for each pixel, a black matrix 37 formed between the color filters 36. In addition, polarizing plates 31A and 31B are formed on the sides of the glass substrates 32A and 32B, respectively, opposite to the liquid crystal layer side.

The polarizing plates 31A and 13B are a type of optical shutters which transmit only light (polarized light) in a certain vibration direction. The polarizing plates 31A and 31B have polarizing axes which are 90° different from each other so that the lamp light LC from the illuminating device 2 is transmitted through the liquid crystal layer 34 or cut off.

The glass substrates 32A and 32B are transparent substrates generally transparent to visible light. Therefore, the substrates 32A and 32B are not limited to glass substrates, and transparent substrates transparent to visible light may be used. Further, a driving circuit (not shown) including TFT (Thin Film Transistor) as a driving element electrically connected to each of the transparent pixel electrodes 33 and wiring is formed on the glass substrate 31A.

The transparent pixel electrodes 33 are composed of, for example, ITO (Indium Tin Oxide) and function as pixel electrodes of the respective pixels. The transparent electrode 35 is also composed of, for example, ITO and functions as a common counter electrode.

The liquid crystal layer 34 is composed of, for example, a TN (Twisted Nemalic) mode or STN (Super Twisted Nematic) mode liquid crystal and functions to transmit or cut off the lamp light LC from the illuminating device 2 in each of the pixels according to the voltage applied from the driving circuit (not shown).

The black matrix 37 is disposed between the color filters 36 in order to cut off the lamp light LC from the illuminating device 2 and prevent the lamp light LC from being emitted to the observation side of the liquid crystal panel 3.

The color filter 36 is adapted to separate the lamp light LC from the illuminating device 2 into the primary colors of red (R), green (G), and blue (B). The color filter includes a red color filter which selectively transmits only a red wavelength region (about 580 nm to 700 nm) of the lamp light LC as white light, a green color filter which selectively transmits only a green wavelength region (about 460 nm to 640 nm), and a blue color filter which selectively transmits only a blue wavelength region (about 380 nm to 480 nm).

The illuminating device 2 can be manufactured, for example, as follows. First, the cold-cathode fluorescent lamps 21 are formed. Specifically, the color phosphors composed of the above-described materials are mixed in a solution of nitro-cellulose in an organic solvent to prepare a suspension. Then, the suspension is poured into a glass tube and dried, and then silver or an exciting gas such as rare gas is sealed in the glass tube. Then, electrodes are provided to the glass tube to form the cold-cathode fluorescent lamp 21. Next, a plurality of the cold-cathode fluorescent lamps 21 are arranged in parallel, and the reflecting plate 22, the diffusion sheet 23, and the prism sheet 24, which are separated prepared, are arranged around the cold-cathode fluorescent lamps 21 to complete the illuminating device 2 shown in FIG. 18.

On the other hand, the liquid crystal panel 3 can be manufactured, for example, as follows: First, the polarizing plate 31A is attached to the back surface of the glass substrate 32A composed of the above-described material, for example, using an adhesive. Then, the transparent pixel electrodes 33 with a predetermined shape are formed on the front surface of the glass substrate 32A. Next, an alignment film (not shown) is formed on the glass substrate 32A and the transparent pixel electrodes 33. Then, the polarizing plate 31B is attached to the back surface of the glass substrate 32B composed of the above-described material, for example, using an adhesive. Next, the black matrix 37 with a predetermined shape is formed on the front surface of the glass substrate 32B. Next, the color filter 36 for each color is formed. Then, the transparent electrode 35 is formed on the color filters 36 and the black matrix 37. Then, an alignment film is formed on the transparent electrode 35. Then, the glass substrates 32A and 32B are laminated with a spacer (not shown) provided therebetween and bonded together with an ultraviolet curable resin or the like so that the transparent pixel electrodes 33 face the transparent electrode 35. Then, a liquid crystal of the above-described mode is injected between the glass substrates 32A and 32B to form the liquid crystal layer 34, thereby completing the liquid crystal panel 3 shown in FIG. 18.

Finally, the illuminating device 2 and the liquid crystal panel 3 manufactured as described above are opposed to each other and bonded by screw fixing. As a result, the liquid crystal display 1 shown in FIG. 18 is completed.

In the liquid crystal display according to am embodiment, the lamp light LC which is white light is emitted from the cold-cathode fluorescent lamps 21 in each of which the red phosphor, the green phosphor, and the blue phosphor are applied to the inner surface. The lamp light LC is emitted to the liquid crystal panel side bar the reflecting plate 22, its brightness variation is decreased by the diffusion sheet 23, and the direction is oriented by the prism sheet 24. The lamp light LC incident on the liquid crystal panel 3 is modulated by, the voltage applied between each transparent pixel electrode 33 and the transparent electrode 35 on the basis of an image signal and separated into the colors by the respective corresponding color fillers 36. As a result, the display light LO including the red display light $LO_r$, the green display light $LO_g$, and the blue display light $LO_b$ is emitted to the display surface on the observation side of the liquid crystal panel 2, displaying a color image.

The above-described configuration shown in FIG. 18 has a direct-lighting type backlight in which the illuminating device 2 is disposed at the back (opposite to the image observation side) of the liquid crystal panel 3. However, the configuration of an edge light type (side light type or waveguide type) backlight may be used, in which a fluorescent lamp is disposed along a side direction of the liquid crystal panel 3 so that light of the fluorescent lamp is applied from the back of the liquid crystal panel 3 through a waveguide.

Next, another example of the display device is described.

FIGS. 19A. 19B, and 19C are a plan view, a sectional view taken along a plane perpendicular to the longitudinal direction of a fluorescent lamp, and a perspective view, respectively, for illustrating an example of a configuration of a display device according to an embodiment.

As shown in FIGS. 19A to 19C, a display device 1A includes a display body 44 having a transmitted image and detachably mounted on the illuminating device 4 shown in FIGS. 17A and 17B. The display body 44 is illuminated with light emitted from the illuminating device 4 so that the transmitted image on the display body 44 can be visualized by illumination. The transmitted image may be, for example, such escape guiding information as shown in FIG. 19C, news information, or advertising information.

EXAMPLES

In order to improve the luminance saturation phenomenon and luminance of $YVO_4$:Eu, a small amount of Tb or Sm was added to $YVO_4$:Eu.

<Synthesis of Phosphor>

FIG. 2 is a table illustrating the preparation of raw materials for synthesizing $YVO_4$:Eu doped with Tb in an example of the present application.

FIG. 8 is a table illustrating the preparation of raw materials for synthesizing $YVO_4$:Eu doped with Sm in an example of the present application.

As shown in FIGS. 2 and 8, $Y_2O_3$ (purity 99.9%): $V_2O_5$ (Purity 99.99%), and $Eu_2O_3$ (purity 99.9%) were used as synthesis raw materials. For Tb and Sm to be added, $Tb_4O_7$ (purity 99.99%) and $SM_2O_3$ (purity 99.9%) were used as raw materials.

These raw materials were mixed in the mixing amounts shown in FIGS. 2 and 8. In addition, as a comparative example, a sample not doped with Tb or Sm was prepared. $V_2O_5$ was charged in an amount of 1.15 times the stoichiometric ratio.

The amount of Tb added was in the range of 10 ppm to 5,000 ppm relative to $YVO_4$:Eu, and the amount of Sm added was in the range of 50 ppm to 25,000 ppm relative to $YVO_4$:Eu. The raw materials were mixed in ethanol in a ball mill system, filtered, and then dried. Then, the resultant mixture was charged in a quartz crucible and fired in air at 1100° C. for 2 hours. After firing, the mixture was washed with an alkali solution and water and then dried.

Then, a synthetic sample of $YVO_4$:Eu doped with Tb was irradiated with ultraviolet light at 254 nm Keith changing irradiation intensities to measure luminance. The ultraviolet irradiation intensity vs luminance characteristics were measured to determine the γ value.

Figure 3:
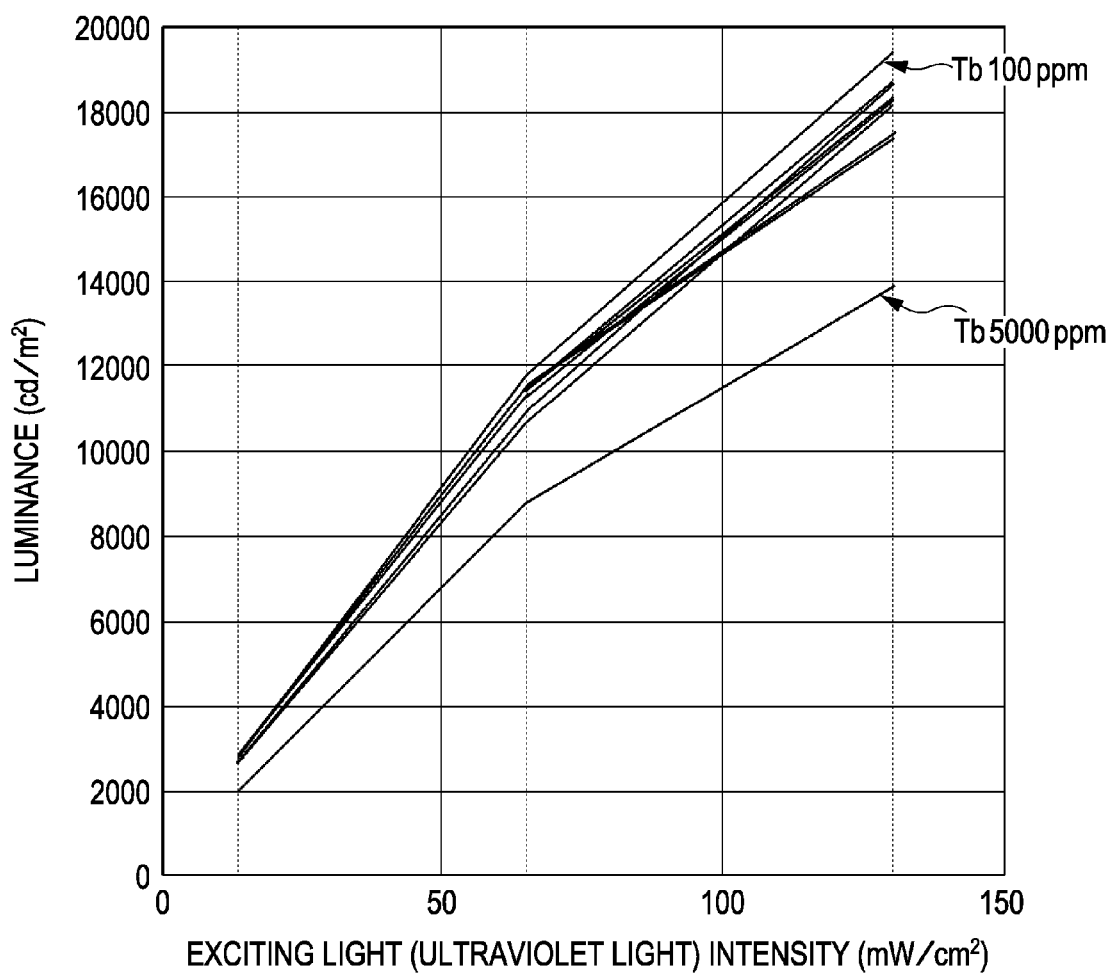
FIG. 3 is a graph illustrating the dependence of luminance of the $YVO_4$:Eu doped with Tb on exciting light irradiation intensity

FIG. 3 is a graph illustrating tile dependence of luminance of $YVO_4$:Eu doped with Tb on exciting light (ultraviolet) irradiation intensity in an example.

FIG. 3 shows plots of the luminance data shown in FIG. 4. However, FIG. 3 shows some of the adding amounts (ppm) because the figure is complicated by overlap of lines.

FIG. 4 is a table numerically illustrating the dependence of luminance of $YVO_4$:Eu doped with Tb on the amount of Tb added with an exciting light (ultraviolet) irradiation intensity in an example.

Figure 5:
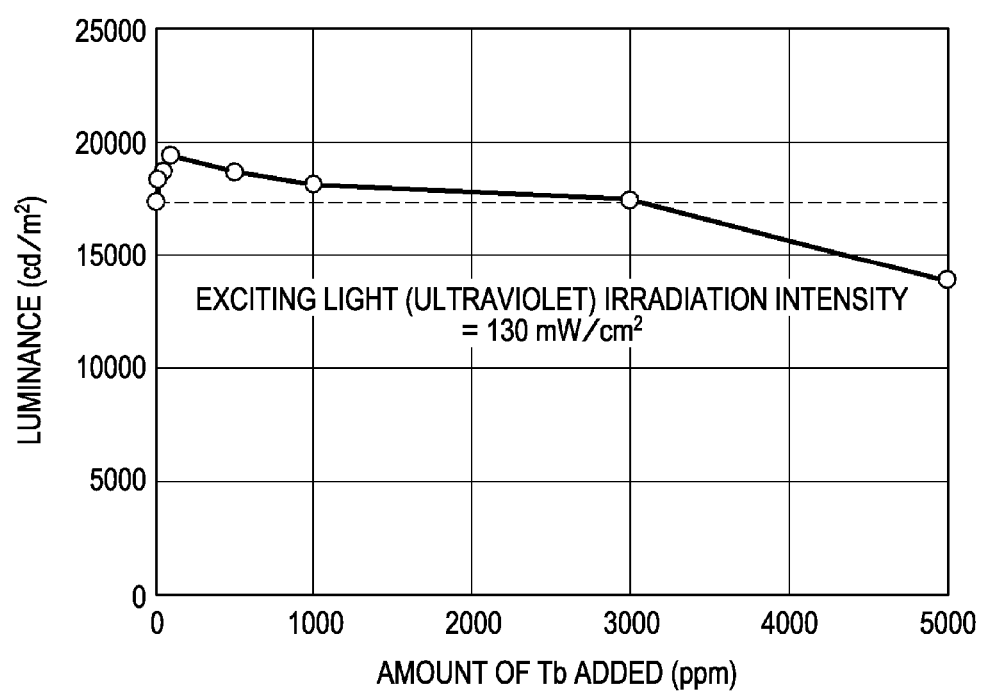
FIG. 5 is a graph illustrating the dependence of luminance of the $YVO_4$:Eu doped with Tb on the amount of Tb added with an exciting light irradiation intensity of 130 mW/cm$^2$.

FIG. 5 is a graph illustrating the dependence of luminance of $YVO_4$:Eu doped with Tb on the amount of Tb added with an exciting light (ultraviolet) irradiation intensity of 130 mW/cm² in an example.

FIGS. 6A, 6B, and 6C are graphs showing plots of a portion of the luminance data shown in FIG. 4, for illustrating the dependence of luminance of $YVO_4$:Eu doped with Tb on the amount of Tb added with an exciting light (ultraviolet) irradiation intensity in an example. In other words, FIG. 6A is a graph showing an enlargement of a portion of FIG. 5, FIG. 6B is a graph illustrating the dependence of luminance of $YVO_4$:Eu doped with Tb on the amount of Tb added with an exciting light (ultraviolet) irradiation intensity of 65 mW/cm², and FIG. 6C is a graph illustrating the dependence of luminance of $YVO_4$:Eu doped with Tb on the amount of Tb added with an exciting light (ultraviolet) irradiation intensity of 13 mW/cm².

FIG. 7 is a table illustrating the dependence (γ value) of luminance of $YVO_4$:Eu doped with Tb on exciting light (ultraviolet) irradiation intensity in an example of the present application.

The results obtained by irradiation excitation with strong exciting light (254 nm and 135 mW/cm²) shown in FIGS. 3 to 7 are as follows:

With $YVO_4$:Eu doped with Tb, γ is in the range of $1.03_0$ to $1.06_3$ times as large as a phosphor not doped with Tb when 0 ppm<(Tb concentration)≦3,000 ppm, and an improvement in γ value can be observed. Also, luminance is in the range of $1.00_4$ to $1.11_5$ times as large as a phosphor not doped with Tb when 0 ppm<(Tb concentration)≦3,000 ppm, and an improvement in luminance can be observed.

Both the luminance and γ of a phosphor $YVO_4$:Eu doped with 10 ppm to 3000 ppm of Tb are larger than $YVO_4$:Eu not doped with Tb.

The luminance of a phosphor $YVO_4$:Eu doped with 10 ppm to 800 ppm of Tb is $1.05_8$, or more times as large as that of a phosphor not doped with Tb, and γ is 1.03 or more times as large as that of a phosphor $YVO_4$:Eu not doped with Tb.

The luminance of a phosphor $YVO_4$:Eu doped with 70 ppm to 340 ppm of Tb is $1.09_0$ or more times as large as that of a phosphor not doped with Tb, and γ is 1.04 or more times as large as that of a phosphor $YVO_4$:Eu not doped with Tb.

The luminance of a phosphor $YVO_4$:Eu doped with 90 ppm to 200 ppm of Tb is $1.10_5$ or more times as large as that of a phosphor not doped with Tb, and γ is 1.04 or more times as large as that of a phosphor $YVO_4$:Eu not doped with Tb.

The luminance of a phosphor $YVO_4$:Eu doped with 50 ppm to 500 ppm of Tb is 1.07, or more times as large as that of a phosphor not doped with Tb, and γ is 1.04 or more times as large as that of a phosphor $YVO_4$:Eu not doped with Tb.

Then, a synthetic sample of $YVO_4$:Eu doped with Sm was irradiated with ultraviolet light at 254 nm with changing intensities to measure luminance. The ultraviolet irradiation intensity vs luminance characteristics were measured to determine the γ value.

FIG. 9 is a graph illustrating the dependence of luminance of $YVO_4$:Eu doped with Sm on exciting light (ultraviolet) irradiation intensity in an example.

FIG. 9 shows plots of the luminance data shown in FIG. 10. However, FIG. 9 shows some of the adding amounts (ppm) because the figure is complicated by overlap of lines.

FIG. 10 is a table numerically illustrating the dependence of luminance of $YVO_4$:Eu doped with Sm on the amount of Sm added with an exciting light (ultraviolet) irradiation intensity in an example.

FIG. 11 is a graph illustrating the dependence of luminance of $YVO_4$:Eu doped with Sm on the amount of Sm added with an exciting light (ultraviolet) irradiation intensity of 130 $mW/cm^2$ in an example of the present application.

FIGS. 12A and 12B are graphs showing plots of a portion of the luminance data shown in FIG. 10, for illustrating the dependence of luminance of $YVO_4$:Eu doped with Sm on the amount of Sm added with an exciting light (ultraviolet) irradiation intensity in an example. In other words, FIG. 12A is a graph showing an enlargement of a portion of FIG. 11, and FIG. 12B is a graph illustrating the dependence of luminance of $YVO_4$:Eu doped with Sm on the amount of Sm added with an exciting light (ultraviolet) irradiation intensity of each of 65 $mW/cm^2$ and 13 $mW/cm^2$.

FIG. 13 is a table illustrating the dependence (γ value) of luminance of $YVO_4$:Eu doped with Sm on exciting light (ultraviolet) irradiation intensity in an example of the present application.

The results obtained by irradiation excitation with strong exciting light (254 nm and 135 $mV/cm^2$) shown in FIGS. 9 to 13 are as follows:

With $YVO_4$:Eu doped with Sm, when 50 ppm≦(Sm concentration)≦5000 ppm, both the γ value and luminance are improved as compared with a phosphor not doped with Sm.

The γ value of a phosphor $YVO_4$:Eu doped with 50 ppm to 4,500 ppm of Sm is in the range of $1.00_3$ to $1.02_1$ times as large as $YVO_4$:Eu not doped with Sm, and an improvement is observed. The luminance is in the range of $1.00_2$ to $1.03_0$ times when 50 ppm≦(Sm concentration)≦4,500 ppm, and an improvement is observed.

The luminance of a phosphor $YVO_4$:Eu doped with 500 ppm to 4000 ppm of Sm is $1.01_2$ or more times as large as that of $YVO_4$:Eu not doped with Sm.

The luminance of a phosphor $YVO_4$:Eu doped with 1000 ppm to 3100 ppm of Sm is $1.02_3$ or more times as large as that of $YVO_4$:Eu not doped with Sm.

A $YVO_4$:Eu sample doped with Tb and Sm was synthesized according to the same procedures as for synthesizing the $YVO_4$:Eu sample doped with Tb or Sm. For a comparison, $YVO_4$:Eu not doped with Tb or Sm and $YVO_4$:Eu doped with 50 ppm of Tb but not doped with Sm were synthesized. Further, a sample doped with 50 ppm of Tb and each of 50 ppm, 500 ppm, and 2000 ppm of Sm was synthesized. In the synthesis, as in the synthesis of $YVO_4$:Eu doped with Tb or Sm, the raw material $V_2O_5$ was charged in an amount of 1.15 times the stoichiometric ratio.

FIGS. 14A and 14B are graphs showing the results of the dependence of luminance Of $YVO_4$:Eu doped with Tb and Sm on the amount of Sm added with an exciting light (ultraviolet light at 254 nm) irradiation intensity of 130 $mW/cm^2$.

FIG. 14A is a graph showing the relative luminance (%) of $YVO_4$:Eu doped with Tb and/or Sm relative to the luminance of 100% of $YVO_4$:Eu not doped with Tb or Sm. In the graph,
the relative luminances shown b) the heights of bars are 100.0, $111._7$, $110._7$, $108._2$, and $105._2$ in the order from the left side.

FIG. 14B shows the luminance data shown in FIG. 14A excluding the data of $YVO_4$:Eu not doped with Tb or Sm, i.e., the luminance data of $YVO_4$:Eu doped with 50 ppm of Tb and each of 0 ppm, 50 ppm, 500 ppm, and 2000 ppm of Sm. Namely, FIG. 14B shows changes in relative luminance (%) relative to the luminance of 100% of $YVO_4$:Eu not doped with Tb or Sm with changes in amount of Sm added.

FIG. 14B indicates that the smaller the amount of Sm added, the higher the relative luminance, and the relative intensity decreases as the amount of Sm added increases.

The luminance of $YVO_4$:Eu not doped with Tb or Sm shown in FIGS. 14A and 14B is 16605 $cd/m^2$ which is lower than the luminance of 17435 $cd/m^2$ of $YVO_4$:Eu not doped with Tb or Sm shown in FIG. 4 or 10. However, the difference is 5% or less.

The luminance of $YVO_4$:Eu doped with 50 ppm of Tb but not doped with Sm is 18540 $cd/m^2$ which is lower than the luminance of 18675 $cd/m^2$ of $YVO_4$:Eu doped with 50 ppm of Tb shown in FIG. 4. However, the difference is 1% or less. In addition, the relative luminance of $YVO_4$:Eu doped with 50 ppm of Tb but not doped with Sm relative to the luminance of 100.0 of $YVO_4$:Eu not doped with Tb or Sm is $111._7$ which is larger than the relative luminance of $107._1$ of doped with 50 ppm of Tb shown in FIG. 4.

Among the phosphors shown in FIGS. 14A and 14B, the luminances of $YVO_4$:Eu doped with 50 ppm of Tb and 50 ppm. 500 ppm, and 2000 ppm of Sm are 18375 $cd/m^2$, 17965 $cd/m^2$, and 17470 $cd/m^2$ respectively. As a result of comparison of these luminance values to the luminances of 19435 $cd/m^2$, 18695 $cd/m^2$, 18175 $cd/m^2$, and 17500 $cd/m^2$ of the phosphors doped with 100 ppm, 500 ppm, 1,000 ppm, and 3,000 ppm of Tb, respectively shown in FIG. 4, the following results are obtained.

The luminance of $YVO_4$:Eu doped with 50 ppm of Tb and 50 ppm of Sm is 18375 $cd/m^2$ which is close to the luminance of 18695 $cd/m^2$ of $YVO_4$:Eu doped with 100 ppm of Tb. The luminances of $YVO_4$:Eu doped with 50 ppm of Tb and 500 ppm and 2000 ppm of Sm are 17965 $cd/m^2$ and 17470 $cd/m^2$, respectively which are close to the luminance of 17500 $cd/m^2$ of $YVO_4$:Eu doped with 3000 ppm of Tb.

According to the results shown in FIG. 4, the relative luminances of $YVO_4$:Eu doped with 50 ppm of Tb and 50 ppm, 500 ppm, and 2,000 ppm or Sm on the basis of the luminance of 100 of $YVO_4$:Eu not doped with Tb or Sm are $110._7$, $108._2$, and $105._2$, respectively. According to the luminance data shown in FIG. 4, the relative luminances of $YVO_4$:Eu doped with 100 ppm, 500 ppm, 1,000 ppm, and 3,000 ppm of Tb on the basis of the same as described above are $111._5$, $107._2$, and $104._2$, respectively. A comparison between the results shown in FIGS. 14A and 14B and the results shown in FIG. 4 shows the following results:

The relative luminance of $110._7$ or $YVO_4$:Eu doped with 50 ppm or Tb and 50 ppm of Sm is close to the relative luminance of $111._5$ of $YVO_4$:Eu doped with 100 ppm of Tb. The relative luminance of $108._2$ of $YVO_4$:Eu doped with 50 ppm of Tb and 500 ppm of Sm is close to the relative luminance of $107._2$ of $YVO_4$:Eu doped with 500 ppm of Tb. The relative luminance of $105._2$ of $YVO_4$:Eu doped with 50 ppm of Tb and 2,000 ppm of Sm is close to the relative luminance of $104._2$ of $YVO_4$:Eu doped with 1,000 ppm of Tb.

The above-mentioned comparison between the results shown in FIGS. 14A and 14B and the results shown in FIG. 4 indicates that with $YVO_4$:Eu doped with Tb and Sm, luminance close to that of $YVO_4$:Eu doped with y ppm ($50 < y \leqq 3000$) of Tb is obtained by adding 50 ppm of Tb and x ppm ($1 < x \leqq 2,000$) of Sm.

It is thus thought that the same effect as that obtained by $YVO_4$:Eu doped with Tb and/or Sm according the present application, i.e., the effect of improving luminance and luminance saturation phenomenon, can be obtained by a $Y(V,P)O_4$:Eu phosphor in which the lattice positions of $YVO_4$:Eu not doped with Tb or Sm are partially or entirely substituted by P. Further, the same effect can be obtained by a $Y(V,P)O_4$:Eu phosphor doped with Tb and/or Sm.

As a result of measurement of luminance of light emitted from a monochrome (red) light-emitting fluorescent lamp (CCFL) with an ordinary current of 6 mA using only $YVO_4$:Eu not doped with Tb and/or Sm, the luminance is about 20,000 $cd/m^2$. In an actual CCFL, ultraviolet light at 185 nm other than ultraviolet light at 254 nm is possibly involved in emission. Therefore, as shown in FIGS. 3 to 6C and 9 to 12B, if the luminance obtained by excitation with only ultraviolet light at 254 nm is about 20,000 $cd/m^2$, a sufficiently practical excitation region is obtained by a fluorescent lamp such as CCFL. Namely, it is thought that a sufficiently practical fluorescent lamp such as CCFL can be formed.

When a fluorescent lamp using the $YVO_4$:Eu doped with Tb and/or Sm according to the present application as a red phosphor is used as a fluorescent lamp (e.g., CCFL) for a display backlight, a display with a wide color gamut and high luminance may be realized.

As described above, a red light-emitting phosphor according to an embodiment has high luminance and improved luminance saturation, and thus can be preferably used as a phosphor for a cold-cathode fluorescent lamp, a hot-cathode fluorescent lamp, an external electrode fluorescent lamp, and an electroless fluorescent lamp. Such a fluorescent lamp can be preferably used as a light source for an illuminating device and a light source for illuminating a display portion of a display device.

As described above, in the present application, in consideration of the luminance saturation properties of a red phosphor $YVO_4$:Eu, it may be possible to improve the luminance properties and luminance saturation properties of undoped $YVO_4$:Eu by adding a small amount of Tb and/or Sm. Therefore, for example, the luminance of a wide color gamut fluorescent lamp (e.g., CCFL) for a liquid crystal backlight can be increased. Namely, it may be possible to realize a luminance improvement of 5% to 10% and improve the luminance saturation properties by irradiating excitation with ultraviolet light at the same intensity as in tile practical region of a fluorescent lamp (e.g., CCFL, HCFL, EEFL, or an electroless fluorescent lamp) for a liquid crystal backlight.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A phosphor comprising Eu-activated $YVO_4$:Eu doped with 50 ppm to 4,500 ppm of Sm, wherein the luminance of light emitted by ultraviolet excitation is higher than that of undoped $YVO_4$:Eu.

2. The phosphor according to claim 1, wherein a luminance saturation constant indicating a relation between luminance of light emitted by ultraviolet excitation and ultraviolet excitation intensity is larger than that of the undoped $YVO_4$:Eu.

3. A fluorescent lamp coated with the phosphor according to claim 1.

4. The fluorescent lamp according to claim 3, wherein the fluorescent lamp is any one of a cold-cathode fluorescent lamp, a hot-cathode fluorescent lamp, an external electrode fluorescent lamp, and an electroless fluorescent lamp.

5. The fluorescent lamp according to claim 3, wherein the phosphor is excited with ultraviolet light to emit red light.

6. A display comprising the fluorescent lamp according to claim 3, the fluorescent lamp serving as a light source for illuminating a display portion.

7. The display according to claim 6, wherein the fluorescent lamp is disposed in a direction perpendicular to a display screen of the display portion or in a side direction of the display screen of the display portion.

8. An illuminating device comprising the fluorescent lamp according to claim 3, the fluorescent lamp serving as a light source.

9. The phosphor according to claim 1, wherein the Eu-activated $YVO_4$:Eu is doped with a range of 50 ppm to 100 ppm of Sm.

10. The phosphor according to claim 1, wherein a ratio of Eu ppm to Sm ppm is at least 500 to 1.

11. The phosphor according to claim 1, wherein the Eu-activated $YVO_4$:Eu is doped with a range of 50 ppm to 500 ppm of Sm.

12. The phosphor according to claim 1, wherein a ratio of Eu ppm to Sm ppm is at least 100 to 1.

13. The phosphor according to claim 1, wherein the Eu-activated $YVO_4$:Eu is doped with a range of 50 ppm to 1,000 ppm of Sm.

14. The phosphor according to claim 1, wherein a ratio of Eu ppm to Sm ppm is at least 50 to 1.

15. The phosphor according to claim 1, wherein the Eu-activated $YVO_4$:Eu is doped with a range of 50 ppm to 2,500 ppm of Sm.

16. The phosphor according to claim 1, wherein a ratio of Eu ppm to Sm ppm is at least 20 to 1.

17. The phosphor according to claim 1, wherein the Eu-activated $YVO_4$:Eu is doped with 100 ppm to 1,000 ppm of Sm.

18. The phosphor according to claim 1, wherein a ratio of Eu ppm to Sm ppm is at least 500 to 1 and at greatest 5,000 to 1.

19. The phosphor according to claim 1, wherein the Eu-activated $YVO_4$:Eu is doped with 500 ppm to 1,000 ppm of Sm.

20. The phosphor according to claim 1, wherein a ratio of Eu ppm to Sm ppm is at least 500 to 1 and at greatest 1,000 to 1.

21. The phosphor according to claim 1, wherein a ratio of Eu ppm to Sm ppm is at least 12 to 1.

* * * * *